United States Patent [19]

Wilder et al.

[11] 4,234,161
[45] Nov. 18, 1980

[54] LINKAGE ASSEMBLY FOR A COUPLER

[75] Inventors: Paul R. Wilder; David A. Oberrecht, both of Cincinnati, Ohio

[73] Assignee: Dover Corporation, New York, N.Y.

[21] Appl. No.: 966,852

[22] Filed: Dec. 6, 1978

[51] Int. Cl.² .................. F16L 29/00; F16L 37/28
[52] U.S. Cl. .................... 251/149.9; 74/105; 74/106; 137/614.06; 251/279
[58] Field of Search .............. 74/99 R, 101, 102, 105, 74/106; 137/614, 614.06; 251/149.9, 279, 280

[56] References Cited

U.S. PATENT DOCUMENTS

| 3,664,634 | 5/1972 | Guertin et al. | 137/614.06 X |
| 3,884,448 | 5/1975 | Millar et al. | 251/149.9 |
| 3,897,091 | 7/1975 | McMath et al. | 137/614.06 X |
| 4,030,524 | 6/1977 | McMath et al. | 137/614.06 |

Primary Examiner—Lawrence J. Staab
Attorney, Agent, or Firm—Kinney and Schenk

[57] ABSTRACT

A linkage assembly for linearly moving a valve of a coupler between its open and closed positions has a yoke pivotally connected to a first link which is fixed to a rotary shaft so that the yoke rotates about the axis of the rotary shaft during a predetermined angular rotation of the rotary shaft. The yoke and a second link, which is pivotally connected to the valve, are in bearing engagement during the predetermined angular rotation. During a portion of the predetermined angular rotation, the center of the bearing surface of the second link is maintained in alignment with the axis of rotation of the shaft by a pin on the second link riding in an arcuate channel fixed to the shaft for rotation therewith.

13 Claims, 11 Drawing Figures

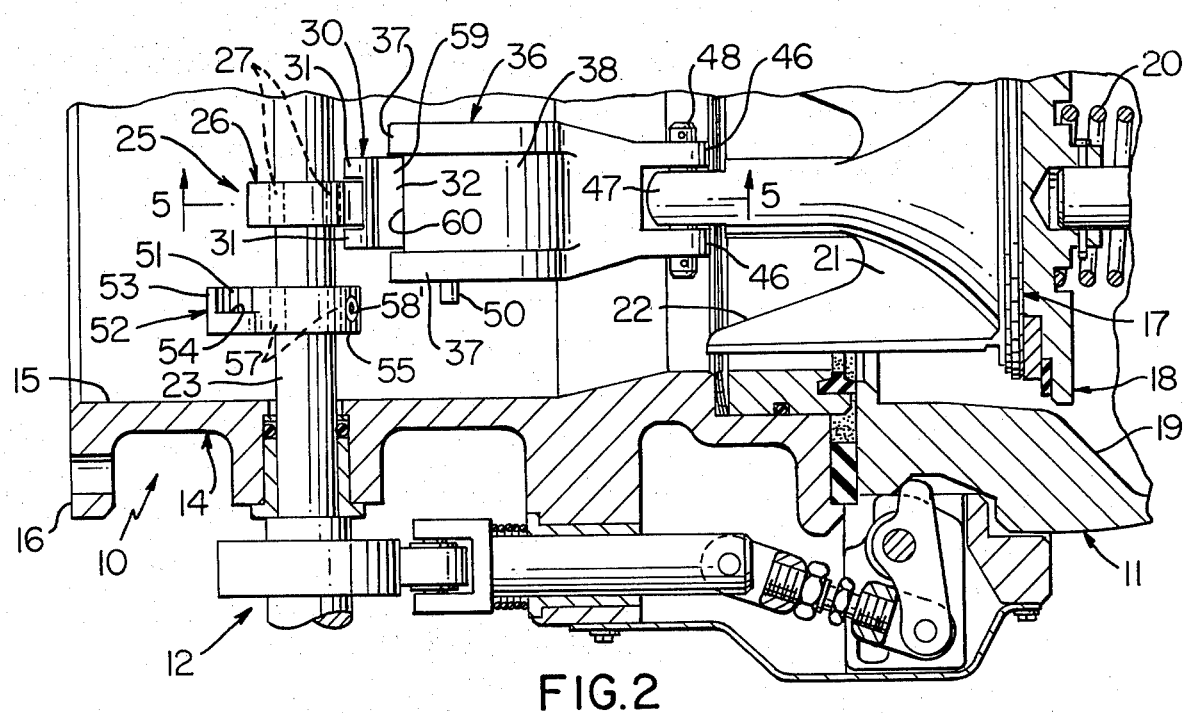

LINKAGE ASSEMBLY FOR A COUPLER

In U.S. Pat. No. 4,030,524 to McMath et al, there is shown a dry break coupler of a coupling device. An adapter is connected to the coupler and locked thereto by rotation of a rotatable shaft. The rotatable shaft also causes a poppet valve, which opens a valve in a passage in the adapter when the poppet valve is opened to provide communication therebetween, of the coupler to be moved to its open position during additional rotation of the rotatable shaft after locking of the adapter to the coupler.

The rotatable shaft is connected to the poppet valve through a linkage assembly. The linkage assembly includes a yoke, which is pivotally connected to a first link fixed to the rotatable shaft, and a second link, which is pivotally connected to the poppet valve so as to pivot relative thereto while producing only axial or linear movement of the poppet valve in response to rotation of the rotatable shaft.

During the initial rotation of the rotatable shaft when the adapter is locked to the coupler, there are cooperating bearing surfaces on the yoke and the second link to enable relative rotation of the yoke with respect to the second link. This relative rotation results in the rotatable shaft rotating without causing any movement of the poppet valve from its closed position until rotation of the rotatable shaft has caused locking of the adapter to the coupler.

In some instances, the bearing surface of the second link has ceased to remain concentric to the rotatable shaft as is the bearing surface of the yoke during its rotation about the axis of the rotatable shaft. When this occurs, the yoke and the second link lock up so that further rotation of the rotatable shaft is prevented. As a result, the coupler is no longer operable and must be repaired.

The present invention satisfactorily solves the foregoing problem through providing an arrangement for maintaining the bearing surface on the second link concentric to the rotatable shaft during the time when the adapter is being locked to the coupler and for a portion of the angular rotation of the shaft thereafter. Thus, in the improved coupler of the present invention, the bearing surface of the second link remains concentric to the rotatable shaft until the yoke has reached a position in which driving of the second link by the yoke is to occur after an additional small rotation of the rotatable shaft.

The present invention maintains the bearing surface of the second link concentric to the rotatable shaft through utilizing guide means on a keeper fixed to the shaft for rotation therewith and a pin on the second link cooperating with the guide means. After the rotatable shaft has rotated a predetermined angular amount, the pin ceases to engage the keeper so that movement of the second link relative to the axis of rotation of the shaft is no longer limited. This is necessary in order for the second link to be able to move the poppet valve to its open position.

An object of this invention is to provide an arrangement to prevent a linkage assembly which transfers rotary motion to linear motion from being locked against movement.

Another object of this invention is to provide an arrangement to prevent a linkage assembly of a coupler from being locked against movement.

A further object of this invention is to provide a coupler having a valve opened at a desired time in a predetermined sequence.

Other objects, uses, and advantages of this invention are apparent upon a reading of this description, which proceeds with reference to the drawings forming part thereof and wherein:

FIG. 2 is a fragmentary longitudinal sectional view, partly in elevation, of a portion of the coupler and similar to FIG. 1 but showing the adapter locked to the coupler and the poppet valve in the coupler moved to its open position in which it opens the valve in the adapter.

FIG. 4 is a fragmentary sectional view of the linkage assembly for connecting the poppet valve of the coupler to its actuating shaft, similar to FIG. 3, but taken after the adapter is locked within the coupler and prior to any movement of the poppet valve of the coupler from its closed position.

FIG. 5 is a fragmentary sectional view of the linkage assembly for connecting the poppet valve of the coupler to its actuating shaft, similar to FIGS. 3 and 4, but taken after the poppet valve of the coupler has been moved to its open position and taken along line 5—5 of FIG. 2.

FIG.. 10 is a perspective view of the yoke of the linkage assembly of the present invention.

Figure 11:
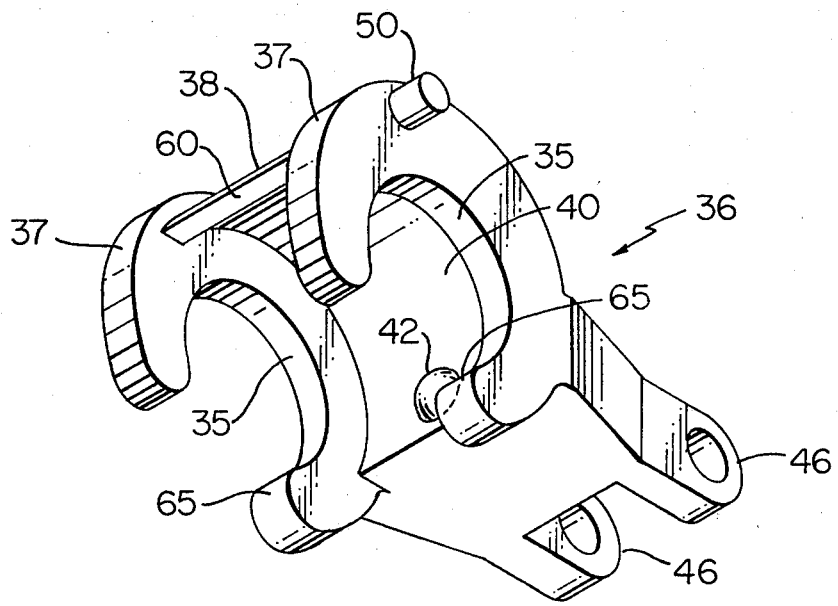

FIG. 11 is a perspective view of the link connecting the yoke of the poppet valve of the coupler.

Figure 1:
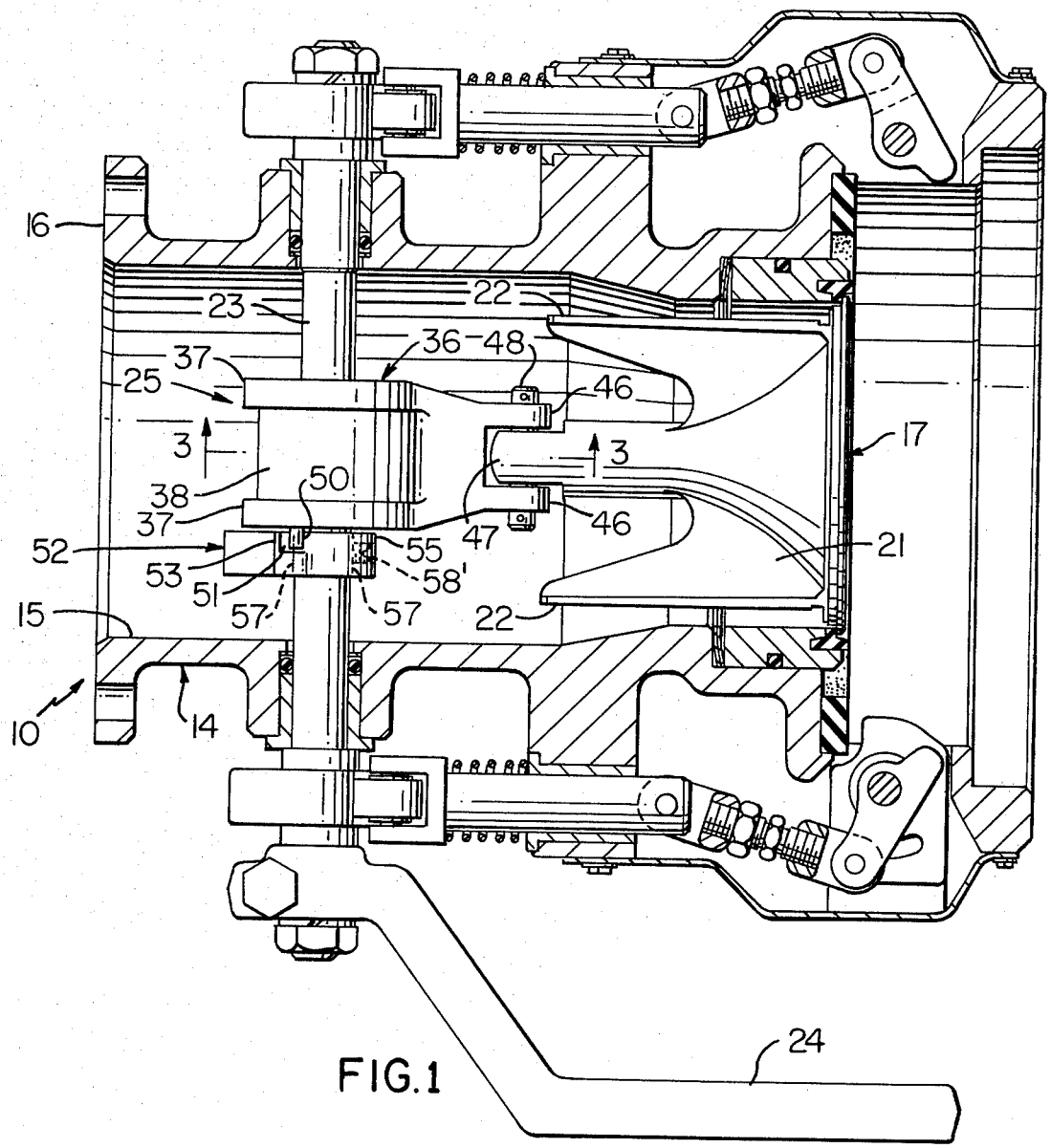
FIG. 1 is a longitudinal sectional view, partly in elevation, of the coupler having the linkage assembly of the present invention without an adapter being received within the coupler.

Referring to the drawings and particularly FIGS. 1 and 2, there is shown a dry break coupler 10 for receiving an adapter 11 (see FIG. 2) therein to form a coupling device 12 in the manner more particularly shown and described in the aforesaid McMath et al patent. The coupler 10 includes a body 14 having a longitudinal passage 15 of circular cross section extending therethrough.

The body 14 has a conduit connected at its end 16, which is opposite to the end receiving the adapter 11, to receive a fluid such as gasoline, for example, under pressure for flow through the passage 15. A poppet valve 17 is slidably disposed within the passage 15 to block flow therethrough when the poppet valve 17 is closed.

When the poppet valve 17 is moved to its open position (see FIG. 2), it opens a resiliently biased valve 18 in a passage 19 in the adapter 11 to enable the high pressure fluid to flow through the communicating passages 15 and 19 to a tank, for example, with which the passage 19 of the adapter 11 communicates. The tank could be that of a gasoline truck, for example. The valve 18 is biased to its closed position by a spring 20.

The poppet valve 17 includes a body 21 having three equally angularly spaced guide legs 22 (two shown in FIG. 1) extending therefrom. The poppet valve 17 cooperates with the valve 18 (see FIG. 2) in the adapter 11 in the manner more particularly described in the aforesaid McMath et al patent.

The locking of the adapter 11 to the coupler body 14, the opening of the poppet valve 17, the closing of the poppet valve 17, and the unlocking of the adapter 11 from the coupler body 14 are controlled through an actuating shaft 23, which is rotatably supported in the coupler body 14. A handle 24 (see FIG. 1) is attached to one end of the shaft 23 to rotate the shaft 23 clockwise (as viewed in FIGS. 3–5) to lock the adapter 11 (see FIG. 2) to the coupler body 14 and then open the poppet valve 17 and to rotate the shaft 23 counterclockwise (as viewed in FIGS. 3–5) to close the poppet valve 17 (see FIG. 2) and then to unlock the adapter 11 from the coupler body 14.

The locking of the adapter 11 to the coupler body 14 is in the manner shown and described in the aforesaid McMath et al patent. The poppet valve 17 has its body 21 connected to the actuating shaft 23 through a linkage assembly 25. The linkage assembly 25 is constructed so that the poppet valve body 21 is not moved by clockwise rotation of the shaft 23 until the adapter 11 had been locked in the coupler body 14 in the manner shown and described in the aforesaid McMath et al patent.

The linkage assembly 25 includes a drive link 26 (see FIGS. 2–5), which is mounted on a pair of flat portions 27 of the actuating shaft 23 and retained thereon by a set screw 28 (see FIGS. 3–5) engaging one of the flat portions 27. The drive link 26 is pivotally connected through a pin 29 to a yoke 30.

Figure 10:
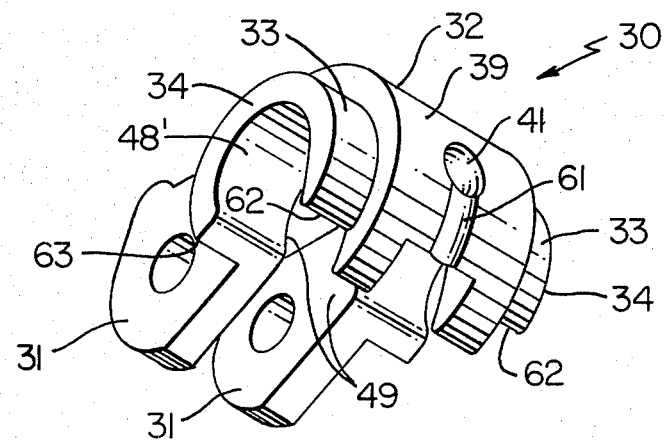

The yoke 30 has a pair of bifurcated ears 31 (see FIGS. 2 and 10) extending from a main body 32 of the yoke 30. The drive link 26 has a portion disposed between the ears 31 with the pivot pin 29 (see FIGS. 3–5) extending through aligned openings in the ears 31 and the drive link 26.

The yoke 30 has a pair of curved bearing surfaces 33 (see FIGS. 8–10) formed on opposite sides of the main body 32 of the yoke 30 on reduced portions 34 thereof. The curved bearing surfaces 33 cooperate with curved inner bearing surfaces 35 (see FIGS. 7–9 and 11) of a link 36. The curved bearing surfaces 35 of the link 36 are the inner surfaces of a pair of arcuate portions 37 on opposite sides of a main body 38 of the link 36.

The main body of the yoke 30 has a curved outer surface 39 (see FIGS. 8–10) of a larger radius of curvature than the reduced portions 34 (see FIG. 10), which have the curved bearing surfaces 33. The curved outer surface 39 of the main body 32 of the yoke 30 cooperates with an inner curved surface 40 (see FIG. 11) of the main body 38 of the link 36. The curved outer surface 39 of the main body 32 of the yoke 30 has a detent 41 (see FIGS. 3–5) therein for cooperation with a ball 42, which is supported in a longitudinal passage 43 in the link 36, to lock the yoke 30 and the link 36 to each other when the ball 42 is in locking engagement with the detent 41.

The ball 42 is resiliently biased into engagement with the detent 41 by a spring 44. A retainer 45, which is a set screw, retains the spring 44 within the passage 43.

The link 36 has a pair of bifurcated ears 46 (see FIGS. 1 and 2) extending from the main body 38 of the link 36 and receiving a stem 47 of the poppet valve 17 therebetween. A pivot pin 48 extends through aligned openings in the ears 46 and the stem 47 to pivotally connect the link 36 to the poppet valve 17.

The main body 32 of the yoke 30 has its central inner surface 48″ (see FIG. 5) formed with a larger radius of curvature than an inner surface 48′ of an overlying portion 49 of the main body 32 of the yoke 30 formed on each side thereof. This provides a recess for the link 26 when the linkage assembly 25 is in the positions of FIGS. 3 and 4 with the overlying portions 49 fitting on each side of the link 26.

The link 36 has a guide pin 50 (see FIGS. 1, 2, and 7) extending downwardly from the lower arcuate portion 37 for cooperation with an arcuate channel 51 (see FIGS. 1, 2, and 6) in a keeper 52. The channel 51 is formed by an arcuate wall 53 extending upwardly from a base 54 of the keeper 52. The base 54 is connected to a central portion 55 (see FIG. 6), which has an opening 56 to receive the shaft 23.

As shown in FIG. 1, the shaft 23 has pair of flat portions 57, which have the same angular positions on the shaft 23 as the flat portions 27, with which flat portions 58 (see FIG. 6) of the opening 56 in the central portion 55 of the keeper 52 cooperate. A set screw 58′ (see FIG. 2) retains the keeper 52 in the desired position on the actuating shaft 23 through engaging one of the flat portions 57 on the shaft 23.

The channel 51 extends for an arc of 112°. When the actuating shaft 23 is in the position of FIG. 1, the guide pin 50 on the link 36 is exterior of the channel 51 in the keeper 52 by only a few degrees.

Figure 3:
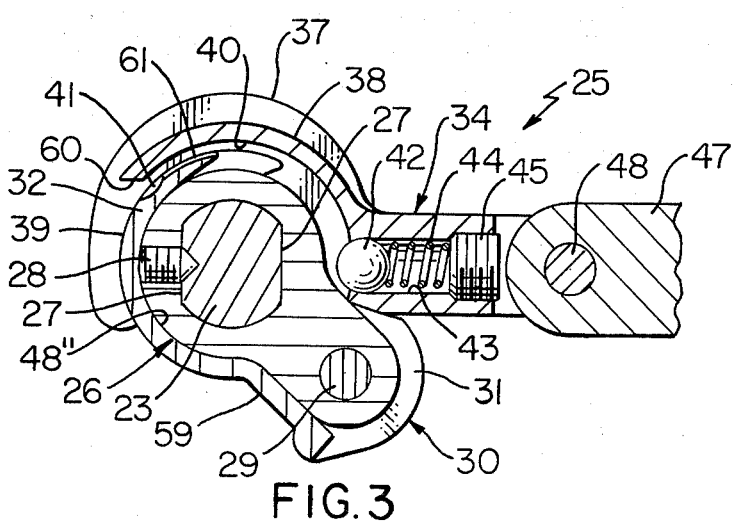
FIG. 3 is a fragmentary sectional view of the linkage assembly for connecting the poppet valve of the coupler to its actuating shaft and taken along line 3—3 of FIG. 1.

Accordingly, when the shaft 23 is rotated clockwise (as viewed in FIGS. 3–5) by the handle 24 (see FIG. 1) to lock the adapter 11 (see FIG. 2) to the coupler body 14, the flat portions 27 (see FIGS. 3–5) and 57 (see FIG. 1) of the shaft 23 rotate from the position of FIG. 3 (This shows only the flat portion 27.) to the position of FIG. 4. In this rotation, the yoke 30 rotates with the shaft 23 and the drive link 26 about the axial of the shaft 23 so that there is no pivoting between the drive link 26 and the yoke 30 about the pivot pin 29. This 90° of clockwise rotation of the shaft 23 locks the adapter 11 (see FIG. 2) to the coupler body 14 as shown and described in the aforesaid McMath et al patent.

During this 90° of clockwise rotation of the shaft 23, the keeper 52 rotates relative to the guide pin 50. Thus, the guide pin 50 is disposed within the channel 51 in the keeper 52 during the 90° of clockwise rotation of the shaft 23.

As a result of the guide pin 50 being disposed within the channel 51 in the keeper 52, the bearing surfaces 35 (see FIGS. 7–9 and 11) of the link 36 remain in engagement with the bearing surfaces 33 (see FIGS. 8–10) of the yoke 30 through the bearing surfaces 35 (see FIGS. 7–9 and 11) of the link 36 being retained concentric to the shaft 23 (see FIG. 1) so that the center of the bearing surfaces 35 (see FIGS. 7–9 and 11) is aligned with the axis of rotation of the shaft 23. As previously mentioned, the yoke 30 (see FIG. 3-5) does not pivot about the pivot pin 29 with respect to the drive link 26 during this 90° of clockwise rotation of the shaft 23.

Thus, the adapter 11 (see FIG. 2) is locked to the coupler body 14 before there is any movement of the poppet valve 17 to its open position. The shaft 23 is rotated through approximately 225° from the position shown in FIG. 4 to the position shown in FIG. 5 in which the poppet valve 17 (see FIG. 2) has been moved to its open position.

When the shaft 23 is rotated approximately 45° clockwise from the position of FIG. 4, a portion 59 (see FIGS. 2-5) of the main body 32 of the yoke 30 between the ears 31 engages an end 60 of the main body 38 of the link 36. This provides a positive driving engagement therebetween for the remainder of the clockwise rotation of the shaft 23. At the same time, the detent 41 in the curved surface 39 of the main body 32 of the yoke 30 has the ball 42 disposed therein to releasably lock the yoke 30 and the link 36 to each other.

The outer curved surface 39 of the main body 32 of the yoke 30 has a camming groove 61 extending from its end to the detent 41 to cam the ball 42 into the detent 41. The engagement of the ball 42 in the groove 61 occurs at approximately the same time as the guide pin 50 (see FIGS. 1, 2, and 7) ceases to be disposed in the channel 51 (see FIGS. 1, 2, and 6) in the keeper 52. This is because relative pivoting between the drive link 26 (see FIGS. 3-5) and the yoke 30 about the pivot pin 29 must begin when the yoke 30 and the link 36 are locked to each other. Therefore, the requirement for the concentricity of the bearing surfaces 35 (see FIGS. 7-9 and 11) of the link 36 with respect to the shaft 23 (see FIGS. 3-5) ceases at the time of the yoke 30 and the link 36 being locked to each other.

Figure 6:
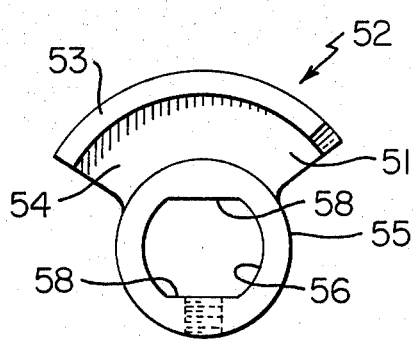
FIG. 6 is a top plan view of a keeper of guide means for maintaining the bearing surface of a link, which is connected to the poppet valve of the coupler, of the linkage assembly concentric to the actuating shaft of the linkage assembly.
Figure 7:
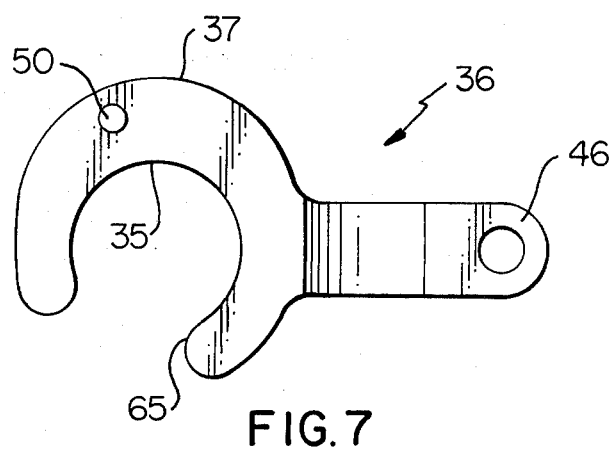
FIG. 7 is a bottom plan view of the link of the linkage assembly connected to the poppet valve and showing a guide pin mounted thereon for cooperation with the keeper of FIG. 6.

During the remaining 180° of clockwise rotation of the shaft 23 after the portion 59 of the main body 32 of the yoke 30 engages the end 60 of the main body 38 of the link 36, the movement of the guide pin 50 (see FIGS. 1, 2, and 6) on the link 36 is not controlled or retained by the keeper 52 (see FIGS. 1, 2, and 6). Therefore, there is relative pivoting between the drive link 26 and the yoke 30 about the pivot pin 29 to move the poppet valve 17 from its closed position of FIG. 1 to its open position of FIG. 2 during this remaining 180° of clockwise rotation to the shaft 23.

During this 180° of clockwise rotation of the shaft 23, the pin 29 rotates clockwise 180° about the axis of the shaft 23 until the pin reaches the position of FIG. 5. The positive driving engagement between the portion 59 of the main body 32 of the yoke 30 and the end 60 of the main body 38 of the link 36 pushes the poppet valve 17 to its open position of FIG. 2 since the guide legs 22 (two shown in FIG. 1) of the poppet valve body 21 allow the poppet valve 17 to move only axially.

With the poppet valve 17 in its open position of FIG. 2, the adapter 11 cannot be unlocked through any accidental disconnection. Instead, it is necessary for the handle 24 (see FIG. 1) to rotate the shaft 23 counterclockwise (as viewed in FIGS. 3-5) so that the poppet valve 17 (see FIG. 1) is first closed. This requires approximately 180° of counterclockwise of the shaft 23.

Another 45° of counterclockwise rotation of the shaft 23 results in the linkage assembly 25 being arranged as shown in FIG. 4. In this position, the detent 41 is no longer receiving the ball 42 and the portion 59 of the main body 32 of the yoke 30 is no longer engaging the end 60 of the main body 38 of the link 36.

During the final 90° of counterclockwise rotation of the shaft 23 by handle 24 (see FIG. 1), the adapter 11 (see FIG. 2) is released from the coupler body 14 in the manner shown and described in the aforesaid McMath et al patent.

During counterclockwise rotation of the shaft 23, the guide pin 50 (see FIGS. 1, 2 and 7) on the link 36 enters the channel 51 (see FIGS. 1, 2, and 6) in the keeper 52 after the ball 42 (see FIGS. 3-5) is no longer disposed in the detent 41 but prior to the ball 42 ceasing to be engaged in the groove 61 in the outer curved surface 39 of the main body 32 of the yoke 30. Thus, this is the same time as that in which the guide pin 50 (see FIGS. 1, 2, and 7) ceased to be disposed within the arcuate channel 51 (see FIGS. 1, 2, and 6) in the keeper 52 during clockwise rotation of the shaft 23 (see FIGS. 3-5).

Figure 8:
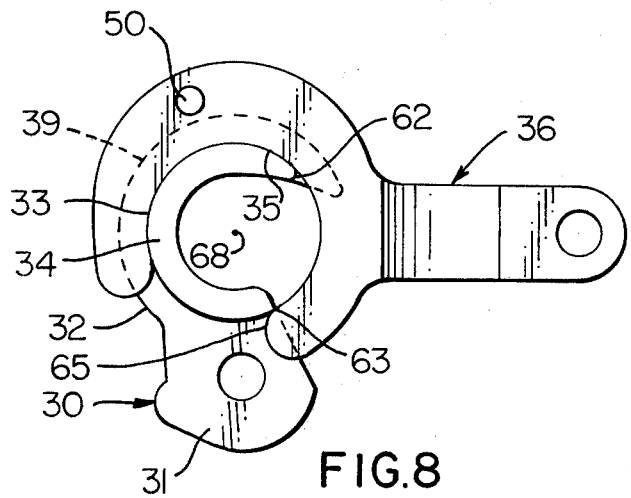
FIG. 8 is a schematic plan view showing the relationship of the yoke and the link connected to the poppet valve of the coupler in a position intermediate the positions of FIGS. 3 and 4.
Figure 9:
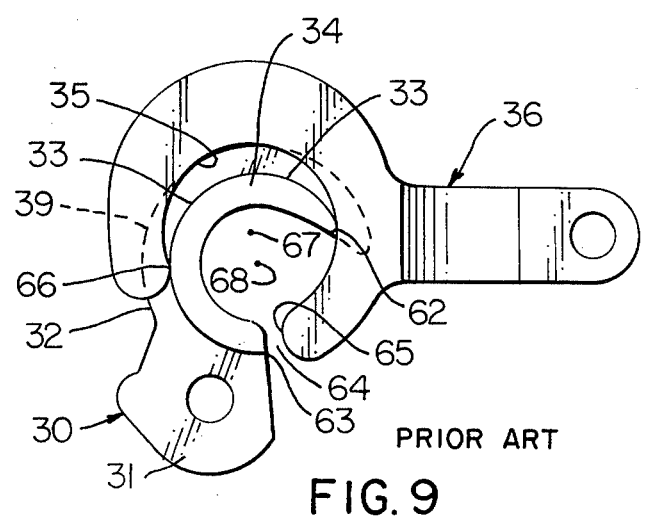
FIG. 9 is a schematic plan view, similar to FIG. 8, of the yoke and the link connected to the poppet valve of the coupler in a position intermediate the postions of FIGS. 3 and 4 and showing their relationship if the guide means of the present invention is not utilized with the position being closer to FIG. 4 than FIG. 8 is to FIG. 4.

Referring to FIGS. 8 and 9, there is shown the relationship of the link 36 to the yoke 30 during rotation of the shaft 23. FIG. 9 shows the relationship if the guide pin 50 (see FIGS. 1, 2, and 7) and the keeper 52 (see FIGS. 1, 2, and 6) were not employed.

In FIG. 8, there has been clockwise rotation of slightly less than 45° of the shaft 23 (see FIGS. 3-5) from the position of FIG. 3 toward the position of FIG. 4. At this time, ends 62 (see FIG. 8) and 63 of each of the bearing surfaces 33 of the yoke 30 are still in engagement with the cooperating bearing surface 35 of the link 36.

Continued clockwise rotation of the shaft 23 from the position of FIG. 8 to the position of FIG. 9 results in a clearance 64 existing between the end 63 of each of the bearing surfaces 33 of the yoke 30 and end 65 of each of the bearing surfaces 35 of the link 36. At this time, the bearing surfaces 33 would have a tendency to lock up at the end 65 and a point 66, and the link 36 pivot about the end 65 of each of the bearing surfaces 33 of the yoke 30 relative to the yoke 30.

Accordingly, center 67 of each of the bearing surfaces 35 of the link 36 would no longer be aligned with center 68 of the yoke 30. The center 68 also is the axis of rotation of the shaft 23 (see FIG. 1).

Therefore, the bearing surfaces 35 (see FIGS. 8 and 9) of the link 36 would no longer be concentric to the shaft 23 (see FIGS. 3-5). As a result, the undesired locking between the yoke 30 and the link 36 would occur to prevent further rotation of the shaft 23.

While the present invention has shown and described the bearing surfaces 35 (see FIG. 8) of the link 36 being retained concentric to the shaft 23 by the utilization of the guide pin 50 (see FIGS. 1, 2, and 7) on the link 36 and the keeper 52 (see FIGS. 1, 2, and 6) on the shaft 23, it should be understood that any other suitable arrangement could be utilized to maintain the bearing surfaces 35 (see FIG. 8) concentric to the shaft 23 (see FIGS. 3-5) for at least the angular rotation of the shaft 23 in which the yoke 30 rotates about the axis of rotation of the shaft 23. Any arrangement must enable the movement of the link 36 away from surrounding relation with the shaft 23.

An advantage of this invention is that it prevents accidental locking of a linkage assembly which receives a rotary input and provides a linear or axial output. Another advantage of this invention is that it insures that a dry break coupler is always opened when desired. A further advantage of this invention is that damage to a linkage assembly for opening and closing of a coupler valve will not occur during opening or closing of the coupler valve.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A linkage assembly for transmitting a rotary input into a linear output including a first link receiving the rotary input for rotation about an axis of rotation, a yoke, first means to pivotally connect said yoke to said first link for rotation of said yoke about the axis of rotation with said first link for a predetermined amount of rotation, a second link, second means to pivotally connect one end of said second link to linear movable means to supply the linear output, said yoke having means cooperating with said second link to transmit pivotal motion of said yoke about said first pivotally connecting means into linear motion of said second link after the predetermined amount of rotation of said yoke, said second link having bearing means to rotatably support said yoke during rotation of said yoke about the axis of rotation, and means to maintain the center of said bearing means of said second link aligned with the axis of rotation substantially throughout the predetermined amount of rotation of said yoke about the axis of rotation with said first link.

2. A linkage assembly for transmitting a rotary input into a linear output including a first link receiving the rotary input for rotation about an axis of rotation, a yoke, first means to pivotally connect said yoke to said first link for rotation of said yoke about the axis of rotation with said first link for a predetermined amount of rotation, a second link, second means to pivotally connect one end of said second link to 1 linear movable means to supply the linear output, said yoke having means cooperating with said second link to transmit pivotal motion of said yoke about said first pivotally connecting means into linear motion of said second link after the predetermined amount of rotation of said yoke, said second link having bearing means to rotatably support said yoke during rotation of said yoke about the axis of rotation, and means to maintain the center of said bearing means of said second link aligned with the axis of rotation for at least a portion of the predetermined amount of rotation of said yoke about the axis of rotation with said first link, said maintaining means including means mounted on said second link and means rotatable with said first link about the axis of rotation and cooperating with said means mounted on said second link for at least a portion of the predetermined amount of rotation of said yoke about the axis of rotation with said first link.

3. The assembly according to claim 2 in which said means rotatable with said first link about the axis of rotation includes arcuate guide means and said means mounted on said second link includes means engaging said arcuate guide means during at least a portion of the predetermined amount of rotation of said yoke about the axis of rotation with said first link.

4. A linkage assembly including a rotating shaft, a first link fixed to said rotating shaft for rotation therewith, a yoke, first means to pivotally connect said yoke to said first link, said first pivotally connecting means rotating about the axis of said rotating shaft with said first link to enable said yoke to initially rotate about the axis of said rotating shaft with said first link for a predetermined angular rotation of said rotating shaft and then to pivot about the axis of said first pivotally connecting means during further rotation of said rotating shaft, a second link, second means to pivotally connect said second link to linear movable means, said yoke and said second link having cooperating bearing means to support said yoke during relative rotation of said yoke with respect to said second link during rotation of said rotating shaft for the predetermined angular rotation, said yoke and said second link having cooperating engaging means to cause movement of said second link by said yoke when said rotating shaft rotates beyond the predetermined angular rotation, and third means to maintain said cooperative bearing means in bearing engagement substantially throughout the predetermined angular rotation of said rotating shaft.

5. The assembly according to claim 4 in which said third means includes means fixed to said rotating shaft for rotation therewith and means mounted on said second link and cooperating with said fixed means to maintain said cooperating bearing means in engagement during at least a portion of the predetermined angular rotation of said rotating shaft.

6. The assembly according to claim 5 in which said fixed means includes an arcuate guide channel having the axis of said rotating shaft as its center and said mounted means on said second link includes a pin riding in said arcuate guide channel.

7. The assembly according to claim 6 in which said arcuate guide channel extends for an arc of more than 90° but less than 180°.

8. The assembly according to claim 4 including means to releasably lock said yoke to said second link and said third means ceases to be effective prior to said releasably locking means being effective.

9. A coupler including a body having a passage therein, valve means in said body passage, actuating means to move said valve means between open and closed positions, said actuating means including a rotatable shaft rotatably supported by said body, a first link connected to said rotatable shaft for rotation therewith, a second link connected to said valve means, a yoke, first pivotally connecting means pivotally connecting said yoke to said first link, said first pivotally connecting means rotating about the axis of said rotatable shaft during rotation of said rotatable shaft, said yoke and said second link having cooperating bearing means to support said yoke during relative rotation of said yoke with respect to said second link, said yoke and said second link having cooperating engaging means to cause movement of said second link by said yoke after said rotatable shaft has rotated a predetermined angular rotation, and means to maintain said cooperating bearing means of said second link concentric with said rotatable shaft substantially throughout the relative rotation of said yoke with respect to said second link.

10. The coupler according to claim 9 in which said maintaining means includes guide means fixed to said rotatable shaft for rotation therewith, means mounted on said second link for cooperating with said fixed means to maintain said cooperating bearing means of said second link concentric with said rotatable shaft, and said fixed means ceases to cooperate with said mounted means prior to completion of the predetermined angular rotation of said rotatable shaft.

11. The coupler according to claim 10 in which said fixed means includes an arcuate guide channel having the axis of said rotatable shaft as its center and said mounted means on said second link includes a pin riding in said arcuate guide channel.

12. The coupler according to claim 11 in which said arcuate guide channel extends for an arc of more than 90° but less than 180°.

13. A linkage assembly for transmitting a rotary input into a linear output including a first link receiving the rotary input for rotation about an axis of rotation, a yoke, first means to pivotally connect said yoke to said first link for rotation of said yoke about the axis of rotation with said first link for a predetermined amount of rotation, a second link, second means to pivotally connect one end of said second link to linear movable means to supply the linear output, said yoke having means copperating with said second link to transmit pivotal motion of siad yoke about said first pivotally connecting means into linear motion of said second link after the predetermined amount of rotation of said yoke, said second link having bearing means to rotatably support said yoke during rotation of said yoke about the axis of rotation, and means independent of said yoke to maintain the center of said bearing means of said second link aligned with the axis of rotation for at least a portion of the predetermined amount of rotation of said yoke about the axis of rotation with said firat link.

* * * * *